(12) United States Patent
Parikh

(10) Patent No.: US 10,140,343 B2
(45) Date of Patent: Nov. 27, 2018

(54) SYSTEM AND METHOD OF REDUCING DATA IN A STORAGE SYSTEM

(71) Applicant: CA, Inc., New York, NY (US)

(72) Inventor: Prashant Parikh, Holtsville, NY (US)

(73) Assignee: CA, Inc., New York, NY (US)

( * ) Notice: Subject to any disclaimer, the term of this patent is extended or adjusted under 35 U.S.C. 154(b) by 821 days.

(21) Appl. No.: 14/616,975

(22) Filed: Feb. 9, 2015

(65) Prior Publication Data

US 2016/0232159 A1 Aug. 11, 2016

(51) Int. Cl.
*G06F 17/30* (2006.01)
*G06F 21/62* (2013.01)

(52) U.S. Cl.
CPC .. *G06F 17/30539* (2013.01); *G06F 17/30598* (2013.01); *G06F 21/6245* (2013.01); *G06F 21/6254* (2013.01)

(58) Field of Classification Search
CPC ......... G06F 17/30539; G06F 17/30598; G06F 17/30569; G06F 21/6245; G06F 21/6254
See application file for complete search history.

(56) References Cited

U.S. PATENT DOCUMENTS

| 9,575,977 B1* | 2/2017 | Bergman | G06F 17/30088 |
| 2002/0073138 A1* | 6/2002 | Gilbert | G06F 17/30 709/201 |
| 2010/0169343 A1* | 7/2010 | Kenedy | G06F 17/30867 707/758 |
| 2010/0332396 A1* | 12/2010 | Etchegoyen | G06F 21/10 705/50 |
| 2014/0047551 A1* | 2/2014 | Nagasundaram | G06F 21/60 726/26 |

* cited by examiner

*Primary Examiner* — Rehana Perveen
*Assistant Examiner* — Huen Wong
(74) *Attorney, Agent, or Firm* — Vierra Magen Marcus LLP

(57) ABSTRACT

The system and method of the present disclosure relates to technology for reducing the amount of data stored in a storage system by processing subsets of data stored in data sources using advanced analytics. The process generally includes extracting data from data sources for analysis by ranking the data, marking the data, identifying pattern changes in the data, comparing pattern changes in the data and purging and/or masking the data for storage. The system also includes databases for storing and defining rules, patterns, policies and classification data to be applied to the data from the data sources and analytics to apply the rules, patterns, policies and classification information on the data. As a result, the data stored in the data sources is reduced, and processing efficiency is increased.

25 Claims, 8 Drawing Sheets

SYSTEM AND METHOD OF REDUCING DATA IN A STORAGE SYSTEM

BACKGROUND

The amount of data in the world has been increasing over time, and analyzing large data sets (i.e., big data) has increasingly become a basis of competition, supporting productivity growth, innovation, and consumer surplus, according to recent research statistics. For example, different market sectors such as healthcare, retail, manufacturing and personal-location data generate enormous amounts of data. As organizations create, store and analyze more data, performance can improve on everything from product inventories to employee productivity and ultimately into their bottom line. Intelligent data collection and advanced analysis can facilitate better management decisions and forecasting. However, big data can be so voluminous and unstructured that organizing it for meaningful analysis is complex and time consuming, not to mention that amount of storage space that is required to maintain the data. Moreover, analyzing big data can suffer from various problems, including missing relevant data, inaccurate algorithms, incorrect assumptions, etc. Thus, many challenges exists in the collection and processing of big data. Such challenges include analysis, capture, curation, search, sharing, storage, transfer, visualization, and privacy violations. Determining how to organize and analyze big data to meet these challenges is a time consuming and daunting task.

BRIEF SUMMARY

The present disclosure, generally described, relates to technology for reducing the amount of data stored in a storage system, and in particular, to analyzing and processing subsets of the data using advanced analytics to reduce the amount of data being stored in the storage system. Intelligently reducing the amount of data will allow for more efficient processing.

The system and method of the present disclosure relates to a data analytics system to process big data having been collected from a wide variety of sources, such as businesses, governments and individuals. Advanced (or big) data analytics, which is the process of examining large data sets having different data types, are used to uncover hidden patterns, unknown correlations, market trends, customer preferences and other useful business information. The process of the present disclosure generally includes extracting data from data sources across networks for analysis by ranking the data, marking the data, identifying pattern changes in the data, comparing pattern changes in the data and purging and/or masking the data for storage. The system also includes databases for storing and defining rules, patterns, policies and classification data to be applied to the data from the data sources and analytics to apply the rules, patterns, policies and classification information on the data. The analytics applying the rules may also apply a predefined rule or set of rules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

The system and method of the present disclosure relates to a data analytics system to process big data having been collected from a wide variety of sources, such as businesses, governments and individuals. Advanced (or big) data analytics, which is the process of examining large data sets having different data types, are used to uncover hidden patterns, unknown correlations, market trends, customer preferences and other useful business information. The process of the present disclosure generally includes extracting data from data sources across networks for analysis by ranking the data, marking the data, identifying pattern changes in the data, comparing pattern changes in the data and purging and/or masking the data for storage. The system also includes databases for storing and defining rules, patterns, policies and classification data to be applied to the data from the data sources and analytics to apply the rules, patterns, policies and classification information on the data. The analytics applying the rules may also apply a predefined rule or set of rules.

Figure 1:
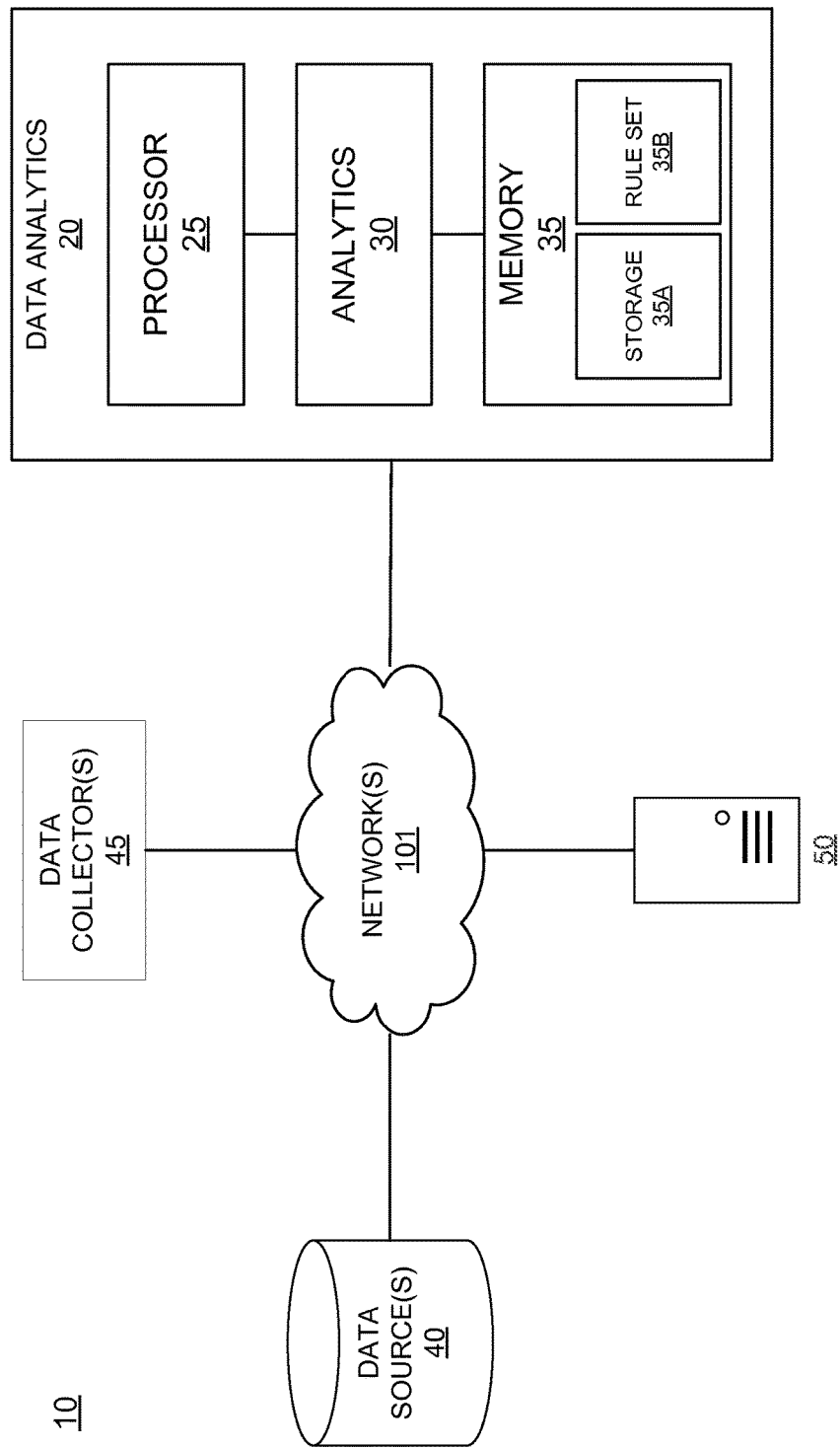
FIG. 1. is an exemplary diagram illustrating a data analytics system for processing big data.

FIG. 1 is an exemplary diagram illustrating a data analytics system for processing big data. The data analytics system 10 includes for example, one or more data sources 40, data analytics 20 and one or more data collectors 45, communicating, for example, via a network 101. The network 101 (described in more detail below) can be a local area network (LAN), a wireless network, a mobile communications network, a wide area network (WAN), such as the Internet, or similar communication system. The data sources 40 can be any type of storage for storing big data collected from any wide variety of sources, such as businesses and government agencies. A few examples of big data stored in the data sources 40 can include, but are not limited to, personal data such as data including salary information, shopping statistics, banking methods, map routes, medical records or more general data such as census statistics, market trends, scientific data, network activity data, social media content and data, etc.

More specifically, the data analytics system 10 relates to big data analytics used to uncover hidden patterns, unknown correlations, market trends, customer preferences and other useful business information. The data sources 40 and the data analytics 20 can be hosted by any type of computing device including server computers, gateway computers, desktop computers, laptop computers, tablet computer, notebook computer, PDA (personal digital assistant), mobile communications devices, cell phones, smart phones, handheld computers, or similar computing device. Alternatively, any combination of the data sources 40 and the data analytics 20 can be hosted on a single computing device including server computers, gateway computers, desktop computers, laptop computers, mobile communications devices, cell phones, smart phones, hand-held computers, or similar computing device.

Data collectors 45 include, for example, any sensor capable of collecting data, web crawlers, pluggable software modules, servers, computers, mobile devices, scanners, etc. The data collectors may reside at independent locations throughout the network 101 or together with the data sources 40. Data collectors may also be directly connected to the network 101 or through any component that is connected or connectable to the network 101. Additionally, the Internet of Things (IoT) allows data to be collected using a different types of data collectors. Objects, animals or people are provided with unique identifiers and the ability to transfer data over a network without requiring human-to-human or human-to-computer interaction. IoT has evolved from the convergence of wireless technologies, micro-electromechanical systems (MEMS) and the Internet. For example, a "thing", in the Internet of Things, can be a person with a heart monitor implant, a farm animal with a biochip transponder, an automobile that has built-in sensors to alert the driver when tire pressure is low—or any other natural or man-made object that can be assigned an IP address and provided with the ability to transfer data over a network.

During operation of the data analytics system 10 (which will be described in more detail below), the data analytics 20 can receive real-time data (or non-real time data) to be collected from one or more of the data sources 40. The data analytics 20 can include a processor 25, analytics 30, and a memory 35. In one embodiment, data collected by the data analytics 20 is stored in storage 35A of memory 35 such that real-time data not requiring processing may be stored for later use. The processor 25, as described below, may process the data according to, for example, rules or rule sets or instructions stored storage 35A of memory 35. The rules can be defined by a user (e.g., system engineer, process engineer, industrial engineer, system administrator, etc.), or generated by the system automatically based on patterns and analysis of data. The rules may also be stored in rule set 35B of memory 35. Processor 25 can also perform processing of the data in storage 35A of memory 35. For example, processor 25 can perform processing, such as massive parallel processing (MPP) of the data, map-reduce processing, on-line transaction processing, extreme transaction processing, etc. The processor 25 can store the results of the processing in storage, such as storage 35A, data sources 40, or any other storage component connected or connectable to the data analytics system 10. Real-time streaming of data can be processed, for example using stream processing designed to analyze and act on the real-time data, using "continuous queries" (i.e., SQL-type queries that operate over time and buffer windows). Essential to stream processing is streaming analytics, or the ability to continuously calculate mathematical or statistical analytics on the fly within the stream. As appreciated, analytics 30 may include stream analytics as part of its processing analytics (see below). Stream processing solutions are designed to handle high volumes of data in real time with a scalable, highly available and fault tolerant architecture. This enables analysis of data in motion. In one embodiment, a data mart provides end users, ad-hoc continuous query access to the streaming data that is aggregated in memory. The data mart analytics is capable of slicing, dicing and aggregating data dynamically in response to input from an end user as it occurs in real time.

The analytics 30 is responsible for analyzing the data in conjunction with the processor 25, as described below in more detail. As appreciated, the amount of data received is extremely large (i.e., big data) and can affect processing of the data. Thus, data analytics 20 is essential to ensuring that the volumes of data being received may be processed and analyzed for more efficient use and storage. The analytics 30 can receive a real-time data stream from the one or more data sources 40. The real-time data stream includes data to be collected by the data analytics 20. The analytics 30 can identify real-time data from the data sources 40 to store in storage 35A in the memory 35, which is resident in the analytics system 20. The analytics 30 can identify the real-time data that does not satisfy one or more rules in the rule set 35B as real-time data, and similarly may identify the real-time data that does satisfy one or more rules in the rule set 35B as real-time data. The analytics 30 may also store data in a format suitable for processing by the processor 25.

In one embodiment, analytics 30 applies analytics on the data in the storage 35A in memory 35 and updates the data based on the applied analytics. In another embodiment, analytics 30 provides the data to a server 50 (or other processing entity) located remotely from data analytics 20 for analysis. The analytics 30 can continuously apply the rules from rule set 35B to the data stream associated with the data sources 40. As the rules are updated or new rules are added, the analytics 30 may apply the updated rules and/or new rules to the data stored in storage 35A. Big data can be analyzed with commonly used software as part of advanced analytics, such as predictive analytics, data mining, text analytics, pattern detection, artificial intelligence, rule based association of patterns, natural language processing and statistical analysis. Business intelligence software and data visualization tools can also be used in the analysis process. However, analytics are not limited to the above described methods, and any type of analytics and data processing may be used, as understood by the skilled artisan. Data analytics are further described with reference to FIGS. 2 and 3 below.

Figure 2:
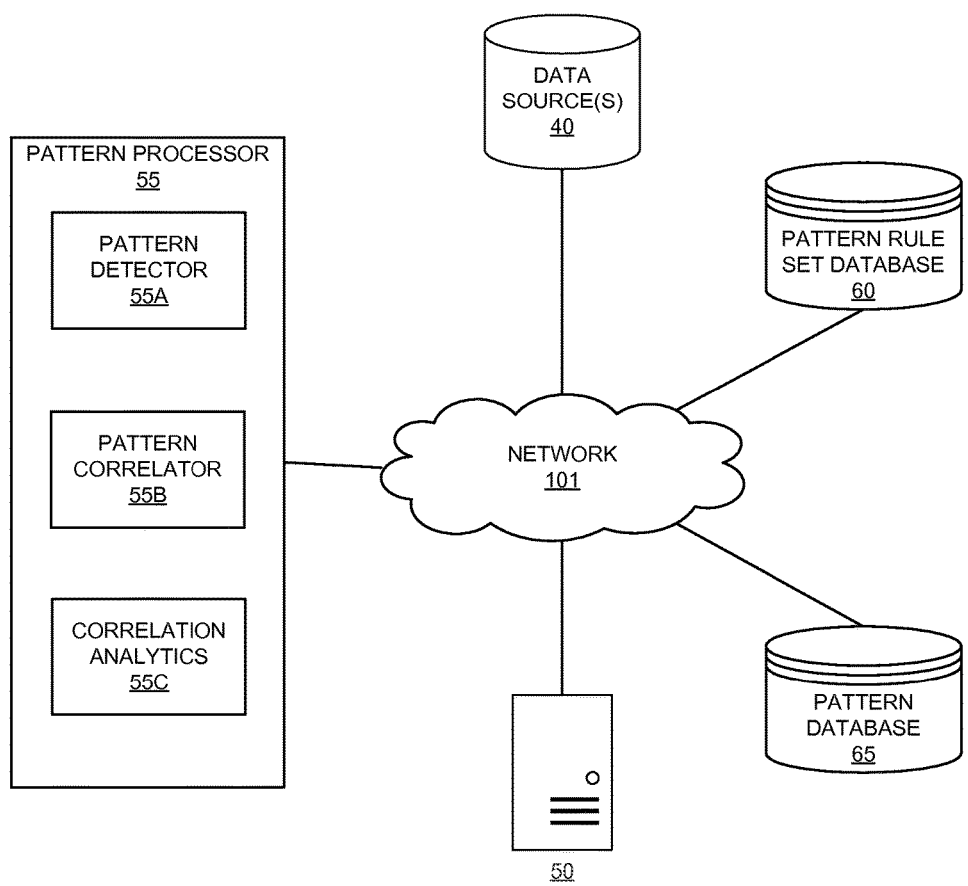
FIG. 2 is an exemplary diagram illustrating a pattern processing system and databases for use with the data analytics system of FIG. 1.

FIG. 2 is an exemplary diagram illustrating a pattern processing system and database for use with the data analytics system of FIG. 1. In one embodiment, pattern processor 55 could be implemented using processor 25 of FIG. 1. In the diagrams that follow, like reference numerals correspond to like elements. The pattern processing system 200 includes a pattern processor 55, data sources 40, server 50, pattern rule set database 60 and pattern database 65 each of which are connected via network 101. The pattern processor 55 may include various elements or components to perform various tasks. For example, the pattern processor 55 may include a pattern detector 55A, a pattern correlator 55B, and correlation analytics 55C. Although these elements 55A, 55B and 55C are illustrated and described with regard to a single pattern processor 55, the functionality of these components may be provided by individual applications, by more than one application, within the same component, or other arrangement.

As part of the process in analyzing big data in a network environment, data or a data set from the big data stored in data sources 40 is extracted, a pattern in the data set is detected or identified by pattern detector 55A, and the detected patterns are correlated and labeled by pattern correlator 55B, such that each label indicates a specific condition associated with the big data. The labels may then be searched using the correlation analytics 55C to answer a query regarding the big data stored in data sources 40. In specific embodiments, detecting the pattern includes capturing gradients between each consecutive adjacent data points in the data set, aggregating the gradients into a gradient data set, dividing the gradient data set into windows, calculating a statistical parameter of interest for each window, aggregating the statistical parameters into a derived data set, and repeating the dividing, the calculating and the aggregating on derived data sets over windows of successively larger sizes until a pattern is detected.

The pattern processor 55 is connected to the network 101, such as one or more of a local area network, the Internet, or other network. Also connected to the network are data sources 40, server 50, pattern rule set database 60 and pattern database 65. As part of the pattern processor 55, the pattern detector 55A executes to retrieve patterns and pattern rules sets from the pattern database and pattern rule set database 65 and 60, respectively, over the network 101. Additionally, reference models may be stored in the pattern and pattern rule set databases 60, 65. The pattern detector then applies the retrieved patterns and pattern rule sets to the pattern correlator 55B and correlation analytics 55C to correlate and determine patterns in big data stored in data sources 40. For example, the pattern correlator 55B generates a relationship sequence with respect to data or data sets retrieved form the data sources 40 and correlates each relationship.

In the example that follows, extracted data includes extracted process data. While the example is described using process data, the analysis is not limited only to process data. Rather, as noted above, the data may be in any form and be collected from a wide variety of sources. As briefly explained above, pattern analysis can be performed by the pattern processor 55 using reference models, pattern rules and pattern rule sets present in the pattern database 65 and pattern rule set database 60. Pattern detector 55A then identifies usage patterns in the extracted data from data sources 40. The extracted data is correlated with data in the pattern and pattern rule set databases 60, 65, which may include previously analyzed data. The data can also be used for adaptive learning, that is, adopting an efficient real time process as a standard reference model in the databases 60, 65.

Analysis of the extracted data by pattern processor 55 in relation to other extracted information from the pattern and pattern databases 60, 65 can provide insight into existing processes. Correlation analytics 55C of pattern processor 55 can promote an understanding of the relationships and interrelationships among applications and processes, and can offer details regarding integration of different applications and process re-engineering including conversion of multiple parallel processes performed by different departments, to a single enterprise-level standard process. Pattern processor 55 and correlation analytics 55C can combine or compare the process data with data from the database 60 to establish what process is where, what belongs, and how it relates to data from database 65. In accordance with one embodiment, pattern processor 55 can determine if a similar process has been encountered using data in databases 60, 65. Upon completion of the analysis, processor 55 may provide the analyzed process data to data sources 40 for storage. Results from applying the analytics may be stored as new or modified patterns or pattern rule sets in the respective databases. Pattern detection is described in more detail with reference to FIGS. 5 and 8.

Figure 3:
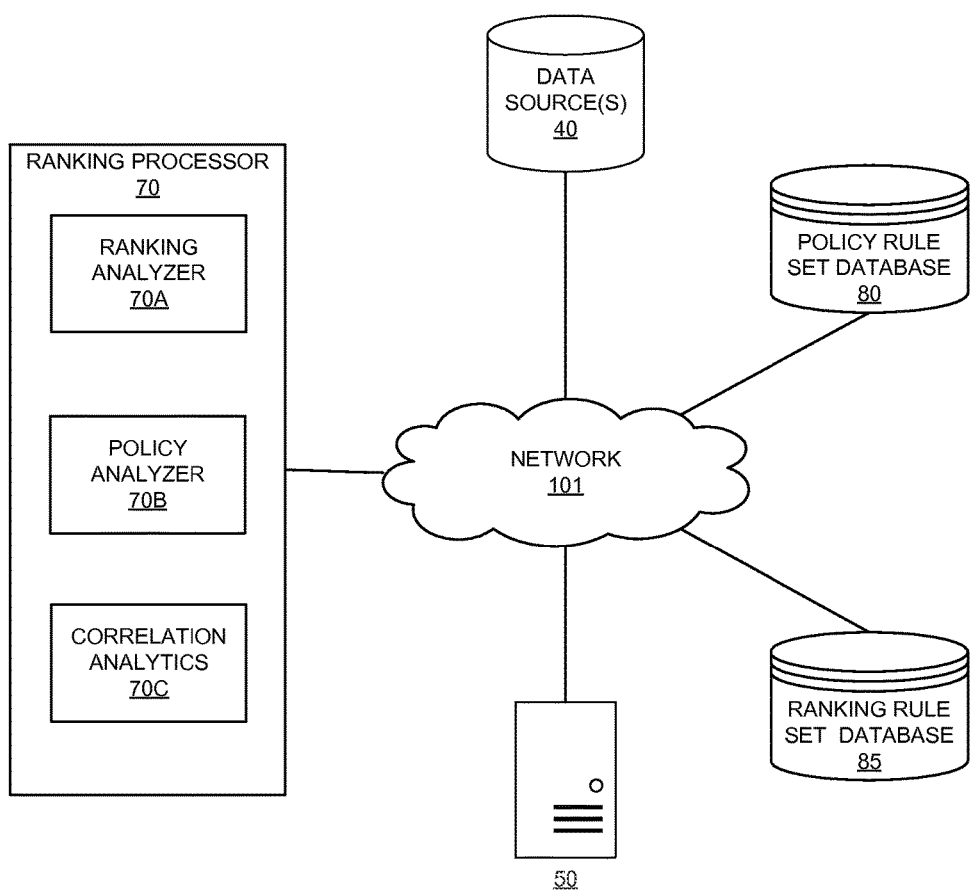
FIG. 3 is an exemplary diagram illustrating a ranking and policy analytics system and databases for use with the data analytics system of FIG. 1.

FIG. 3 is an exemplary diagram illustrating a ranking and policy analytics system and databases for use with the data analytics system of FIG. 1. In one embodiment, ranking processor 70 could be implemented using processor 25 of FIG. 1. The rank processing system 300 includes a ranking processor 70, data sources 40, server 50, policy rule set database 90 and ranking rule set database 95 each of which are connected via network 101. The ranking processor 70 may include various elements or components to perform various tasks. For example, the ranking processor 70 may include a ranking analyzer 70A, a policy analyzer 70B, and correlation analytics 70C. Although these elements 70A, 70B and 70C are illustrated and described with regard to a single ranking processor 70, the functionality of these components may be provided by individual applications, by more than one application, within the same component, or other arrangement. The ranking and processing of policies against the data will be used by the system of FIG. 1 to purge (i.e., reduce) and mask data stored in data sources 40, as further described below with reference to the various figures.

Ranking by the ranking processor 70 may begin once the data in data sources 40 has been analyzed by the processor 25 and analytics 30 of data analytics 20, including completion of pattern processor 55 and any other analytics being executed to analyze the data (for example, the analysis of data described with reference to FIG. 6). In the example that follows, the data being retrieved and analyzed from data sources 40 is document data. Ranking analyzer 70A of ranking processor 70 may analyze the retrieved document data to identify document data satisfying a particular criteria or rule, such as a rule from ranking rule set database 85. For example, document data may be identified that contains one or more terms or phrases, or identifying document data that satisfies the particular criteria or rule and is within a predetermined threshold (for example, a term must appear more than 100 times before the predetermined threshold is met). Yet other techniques are known to those skilled in the art. After identifying the document data, the ranking analyzer 70A may then score the documents based on a ranking rule set stored in ranking rule set database 85. For example, ranking analyzer 70A and correlation analytics 70C may determine which rule sets in the ranking rule set database 85 apply, as well as correlate sets of document data to one another based on the various rule sets. Finally, the scored and correlated document data may then be ranked or prioritized based on the results.

In addition to scoring and ranking the data, policies can also be applied to the data using policy analyzer 70B and policy rules stored in policy rule set database 80. The policies stored in policy rule set database 80 may include, but are not limited to, sensitive data policies, backup and restore policies, access policies, privacy policies and others that may be used to analyze the data. For example, in the case of sensitive or privacy data policies, the policy analyzer 70B may select a set of sensitive data types that need to be protected. Examples include, but are not limited to, credit card numbers, social security numbers, medical record numbers, addresses, names of patients, names high net-worth individuals, driver's license numbers, and bank account numbers. There can also be policies stored in the policy rule set database 80 controlling how the sensitive data, once identified, is handled by the policy analyzer 70B. For example, one policy might state that credit card numbers should be masked with a format-preserving masking. The same policy may also indicated that social security numbers need to be encrypted with a particular encryption key. A different policy might indicate that telephone numbers need to be masked consistently. The same policy may also state that any file containing particular email addresses needs to be quarantined, i.e., access to it should be restricted. Once the policies relating to data privacy are defined, the policy analyzer 70B upon detecting the sensitive will ensure that the policies are properly adhered to by the system. Additionally, a policy may state that data should not be included in scoring or ranking, or should not be correlated with other data by the correlation analytics 70C.

Figure 4:
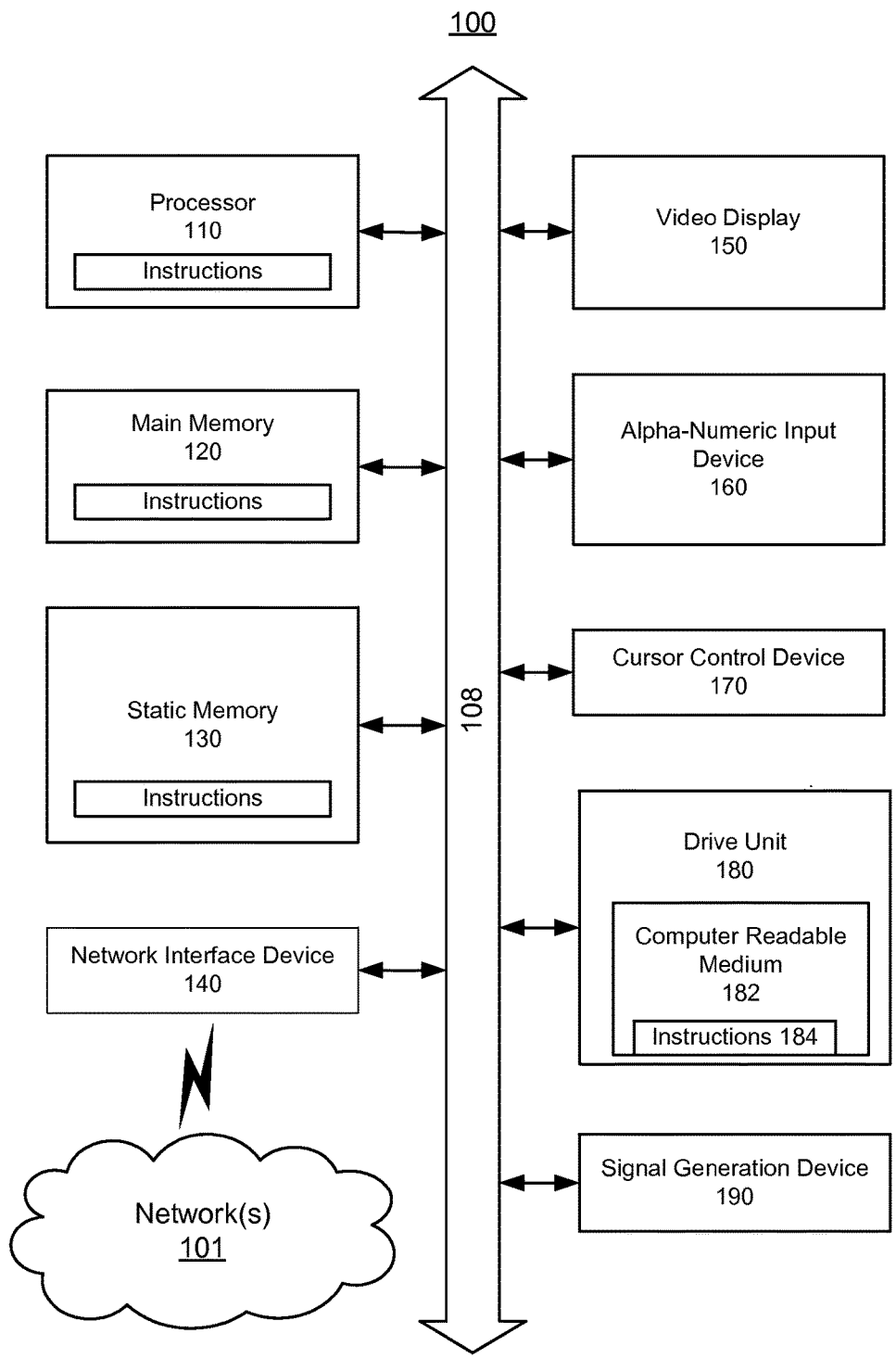
FIG. 4 shows an exemplary general computer system that may be used to implement the system depicted in FIGS. 1, 2 and 3.

FIG. 4 is an illustrative embodiment of a general computer system to implement the systems depicted in FIGS. 1, 2 and 3. The general computer system which is shown and is designated 100 may be used to implement devices such as data analytics 20 and processors 25, 55 and 70 (and/or any other system components) illustrated in FIGS. 1-3. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment sub-system, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 4, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each, and processor 110, other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 4, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 5:
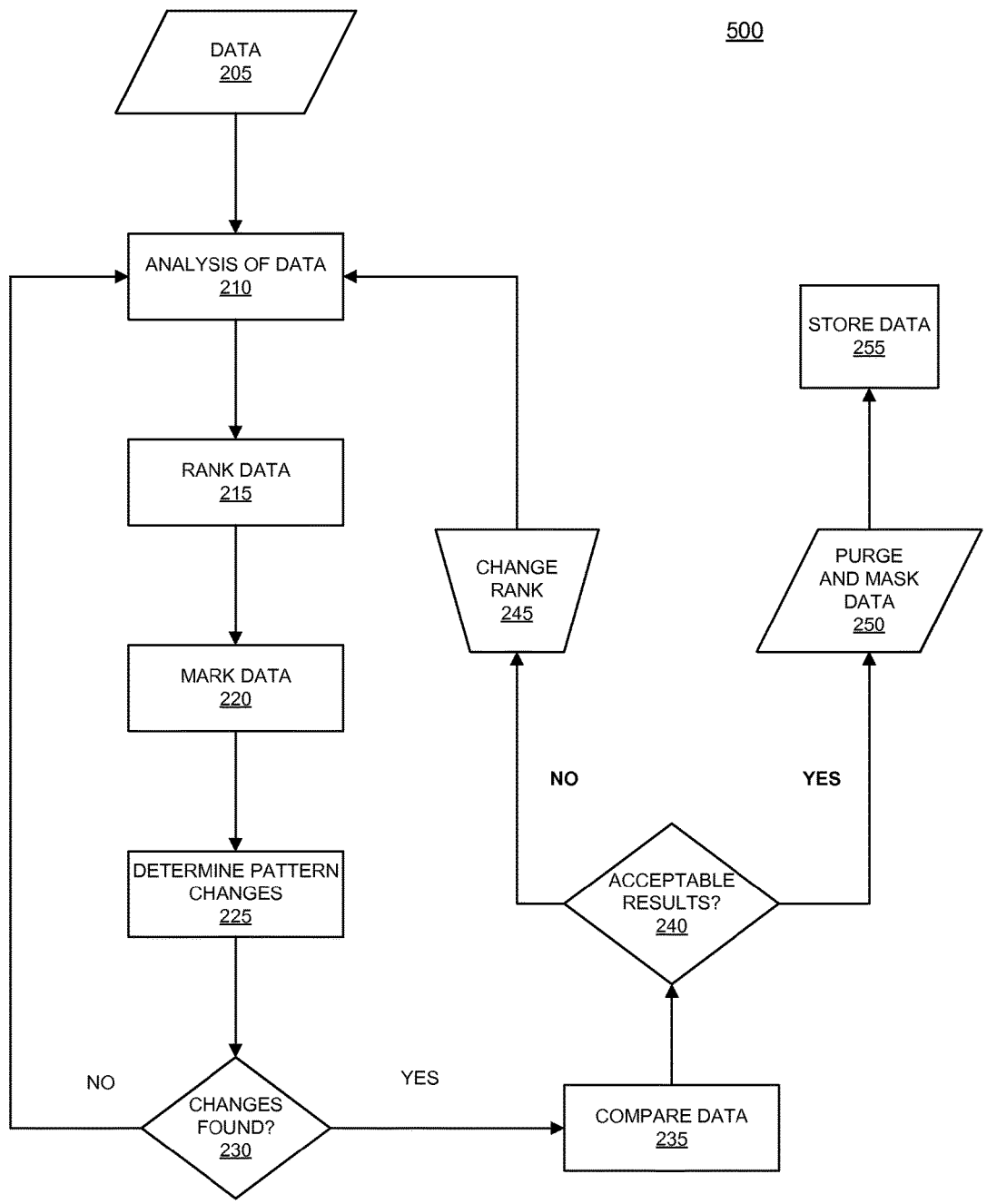
FIG. 5 is an exemplary flowchart of processing big data for data reduction in accordance with the systems of FIGS. 1-3.

FIG. 5 is an exemplary flowchart of processing big data for reduction in accordance with the systems of FIGS. 1-3. That is, the process described below may be implemented by any of the systems and components described and illustrated in FIGS. 1-3. The process generally includes extracting data from the data sources for analysis by ranking the data, marking the data, identifying pattern changes in the data, comparing pattern changes in the data and purging and/or masking the data for storage. The system also includes databases storing and defining rules, patterns, policies and classification data to be applied to the data from the data sources and analytics to apply the rules, patterns, policies and classification information on the data. The analytics applying the rules may apply a pre-defined rule or set of rules. With reference to FIG. 5, data is extracted from data sources 40 at 205. The data sources 40 may include, for example, structured data sources, unstructured data sources, email servers, enterprises data, log files, etc. The data sources 40 may also include batch and real-time data sources. Real-time data sources include, for example, streaming data as described above. While the disclosed embodiment refers to data extraction from data sources 40, the data may be collected and extracted from any element or component connected to the system, such as server 50. At 210, using for example the data analytics 20, the extracted data from the data sources 40 is analyzed. The analysis of data includes used of analytical tools to determine various features and characteristics of the data, such as relevancy of the data as determined by pattern analysis, age or persistence of the data, sensitivity and privacy of the data and any other input or query condition (manual or automatic) that may be entered into the analytics for use during the analysis. Each of the analytical tools may be based on rules or sets of rules stored in corresponding databases, such as databases 60, 65, 80 and 85 described above. A more detailed discussion of the analytical tools will be described below with reference to FIG. 6.

At 215, the analyzed data is then ranked or prioritized, using for example ranking processor 70, to determine whether data should be marked for purging (i.e., reduction) and/or masking. Data may be scored using ranking analyzer 70A based on a ranking rule set stored in ranking rule set database 85. For example, ranking analyzer 70A (along with correlation analytics 70C) may determine which rule sets in the ranking rule set database 85 apply, as well as correlate sets of data to one another based on the various rule sets. The scored and correlated data may then be ranked for purging based on the results. For example, if a rule in the ranking rule set database 85 is "purge data greater than 5 years old", any data that is determined by the ranking analyzer 70A to be five or more years old will be ranked to meet a threshold condition for purging. Similarly, data may be analyzed to determine whether policies or policy rules stored in the policy rule set database 80 apply to the data. For example, a policy may exist that any data including credit card information be identified as private and sensitive, such that the data is masked from any other data. When the policy analyzer 70B analyzes the data, it will reference the policy rule set database 80 to determine whether the data satisfies the policy, and mask the data accordingly. Data that is identified in the ranking 215 to be marked for purging or masking is marked at 220. Marking the data may include setting a flag or tagging the data for purging or masking in any manner well known in the art. A further description of the ranking and masking will be described with reference to FIG. 7 below.

Once the data has been marked at 220, using for example processor 25, 55 or 70, the extracted data without the marked data is analyzed to determine whether any pattern changes exists. That is, the extracted data without the marked changes (hereinafter, unmarked data) is analyzed by the pattern detector 55A which applies the patterns and pattern rule sets retrieved from pattern and pattern rule set databases 60, 65. The pattern detector 55A, in conjunction with the pattern correlator 55B and correlation analytics 55C, then determines patterns in the unmarked data at 225. The analysis can include, for example, identifying usage patterns, comparing extracted data with pre-defined processes or known patterns in the pattern and pattern rule set databases 60, 65, and other techniques known in the art. Additionally or alternatively, the analysis may be the same or similar to the analysis described above with respect to 210. Once patterns have been determined (i.e., found) in the unmarked data by the pattern detector 55A at 230, the identified patterns in the unmarked data are compared to the patterns identified in the extracted data (i.e., the analyzed data prior to marking) at 235 using for example processor 25. For example, processor 25 of data analytics 20 can compare the analyzed data prior to marking with the analyzed data after marking. Analysis of the data may include, for example, mining the data for natural language text by transposing words and phrases in unstructured data into numerical values or scores that can be linked with structured data (e.g., rules or rule sets) stored in the various rule databases. The mined data in the analyzed data prior to marking could be compared to the mined data in the data after marking (i.e., marked data) to determine whether any changes exist, and if so, whether the changes are significant. That is, the comparison may determine whether the changes fall within a range or meet a threshold value (determine whether the changes are acceptable) at 240. If patterns are not detected at 225, then the data is re-analyzed by applying different criteria, such as different rules or rule sets. A more detailed description of determining pattern changes is detailed below with reference to FIG. 8.

At 240, if the processor 25 determines that the comparison results in satisfying the range or threshold value, then the results are deemed acceptable. The marked data is then purged or masked at 250 for example by processor 25. Specifically, data that has been previously marked to be purged at 220 will be deleted from the data, and data that has been previously marked to be masked at 220 will be hidden from the data. The purged and masked data will then be stored permanently in the data sources 40. As will be appreciated, the purging and masking of data provides a reduction in the amount of data to be stored and processed. This purging and masking of big data is key in the ability to continually acquire and collect new data, while at the same time providing an affordable and reliable way to maintain data for processing at reasonable speeds and cost. If, on the other hand, the results of the comparison at 240 are not acceptable, then the criteria used to analyze the data is changed at 245 using, for example, processor 25. For example, the rules, rule sets, policies, classification, relevancy, sensitivity, privacy, etc. may be modified by altering the parameters defining the analytics. Also, the ranking scores may be changed to define how analyzed data is ranked for purging and masking, and the range or threshold criteria of marking the data for purging or masking may be changed. Once the changes have been made, the extracted data (prior to analysis) is analyzed again at 210.

Figure 6:
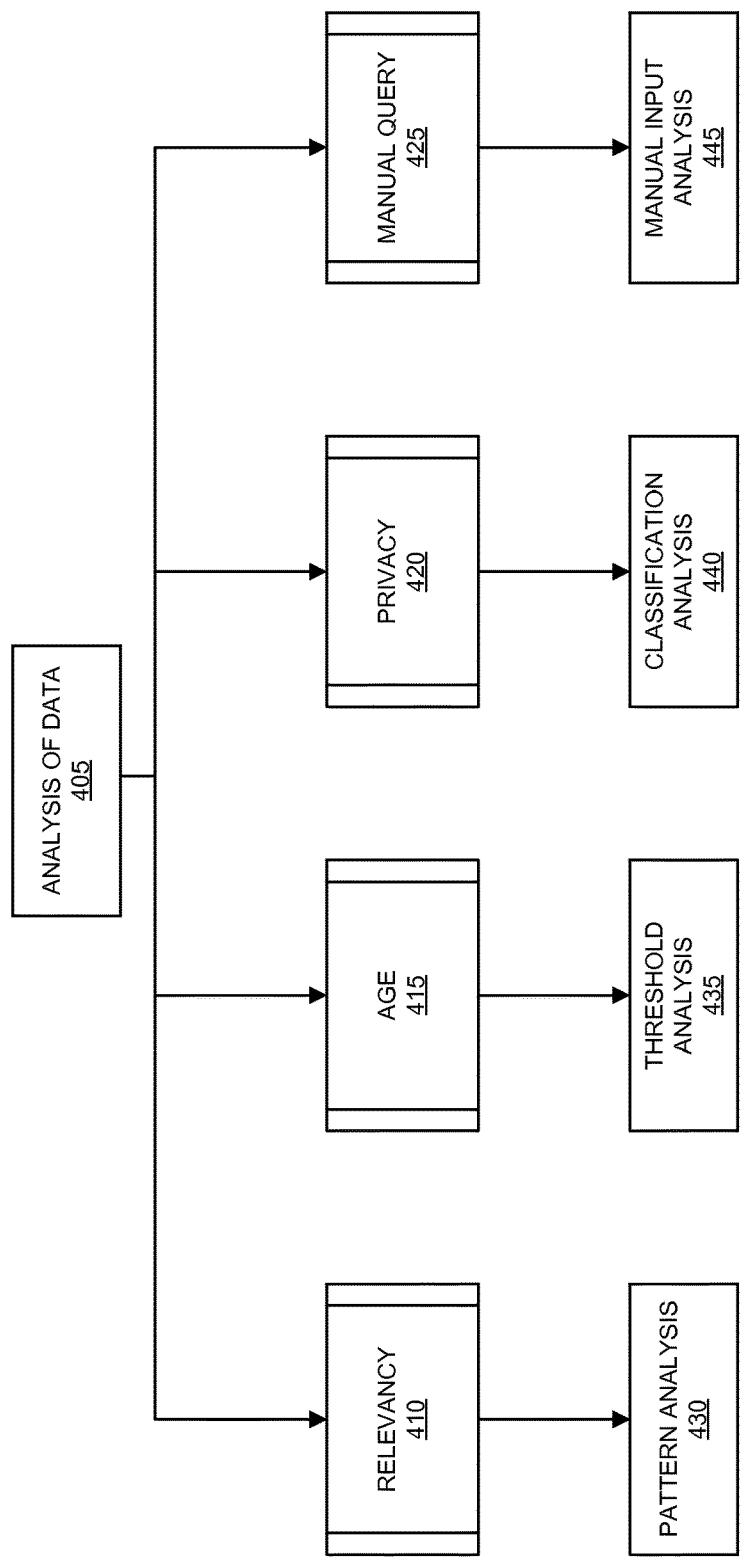
FIG. 6 is an exemplary flowchart of the data analysis described with reference to FIG. 5.

FIG. 6 is an exemplary flowchart of the data analysis described with reference to FIG. 5. In particular, FIG. 6 discloses a more detailed description of the analysis of data in 210 of FIG. 5. Data analysis and analytics includes a wide range of existing technologies and mechanisms, many of which may be employed in the current system to analyze data. In the embodiments that follow, the technologies and mechanisms focus on analysis of big data using advanced analytics. It is appreciated that the analytics disclosed herein are non-limiting and exemplary in nature. Advanced analytics may include, for example, predictive analysis, data mining, big data analytics and location intelligence. Any of these mechanisms may be used together or individually to analyze big data. In the example of FIG. 6, the analysis of data 405 includes parsing the data into various categories such as relevancy 410, age 415, privacy data 420 and manual query data 425. Each category of data is processed using a corresponding set of analytics, as described above. Moreover, it is appreciated that the depicted categories are non-limiting examples of parsing dating, and that other categories of data may equally be applied. As explained above, pattern analysis 430 includes, for example, the pattern detector 55A executing to retrieve patterns and pattern rules sets from the pattern database and pattern rule set database 65 and 60, respectively, over the network 101. The pattern detector then applies the retrieved patterns and pattern rule sets to the pattern correlator 55B and correlation analytics 55C to correlate and determine patterns in big data stored in data sources 40. For example, the pattern correlator 55B generates a relationship sequence with respect to data or data sets retrieved form the data sources 40 and correlates each relationship. The determined relationships and patterns are then used to determine the relevancy of the data.

A threshold analysis (or range analysis) 435 may be used to determine the persistence of data or whether the data satisfies a particular range. That is, data is analyzed to determine whether it falls within a specified range or meets a certain criteria or threshold as part of the analysis of data 405. If the data meets the specific requirements, then it may be used as part of the analysis, otherwise the data will be marked for purging or masking as not falling within the "age" requirements.

Privacy analysis 420 includes the classification of data using classification analysis 440. Once data is classified as private, using for example rules stored in policy rule set database 80, a classification analysis 440 on the private data the policy analyzer 70B may be executed. For example, in the case of sensitive or privacy data policies, the policy analyzer 70B may select a set of sensitive data types that need to be protected. Examples include, but are not limited to, credit card numbers, social security numbers, medical record numbers, addresses, names of patients, names high net-worth individuals, driver's license numbers, and bank account numbers. In one embodiment, the privacy analysis of the data identified as sensitive traces events related to privacy, summarizes activity relating to the access to personal data, and flags any suspected breaches of privacy rules.

Manual query 425 includes the analysis of data based on rules, parameters, characteristics, etc. that have been manually input into the system. A manual input analysis 445 may include, for example, defining the type of data sources available, locations of available data sources, access rights of the available data sources, data formats of the available data sources, etc. The manually input information can be a predefined set of rules or defined at the time of data extraction. The set of predefined rules may include definitions for how the raw data and/or information sources has to be cleansed, parsed, and transformed at the time of data extracting and processing.

Figure 7:
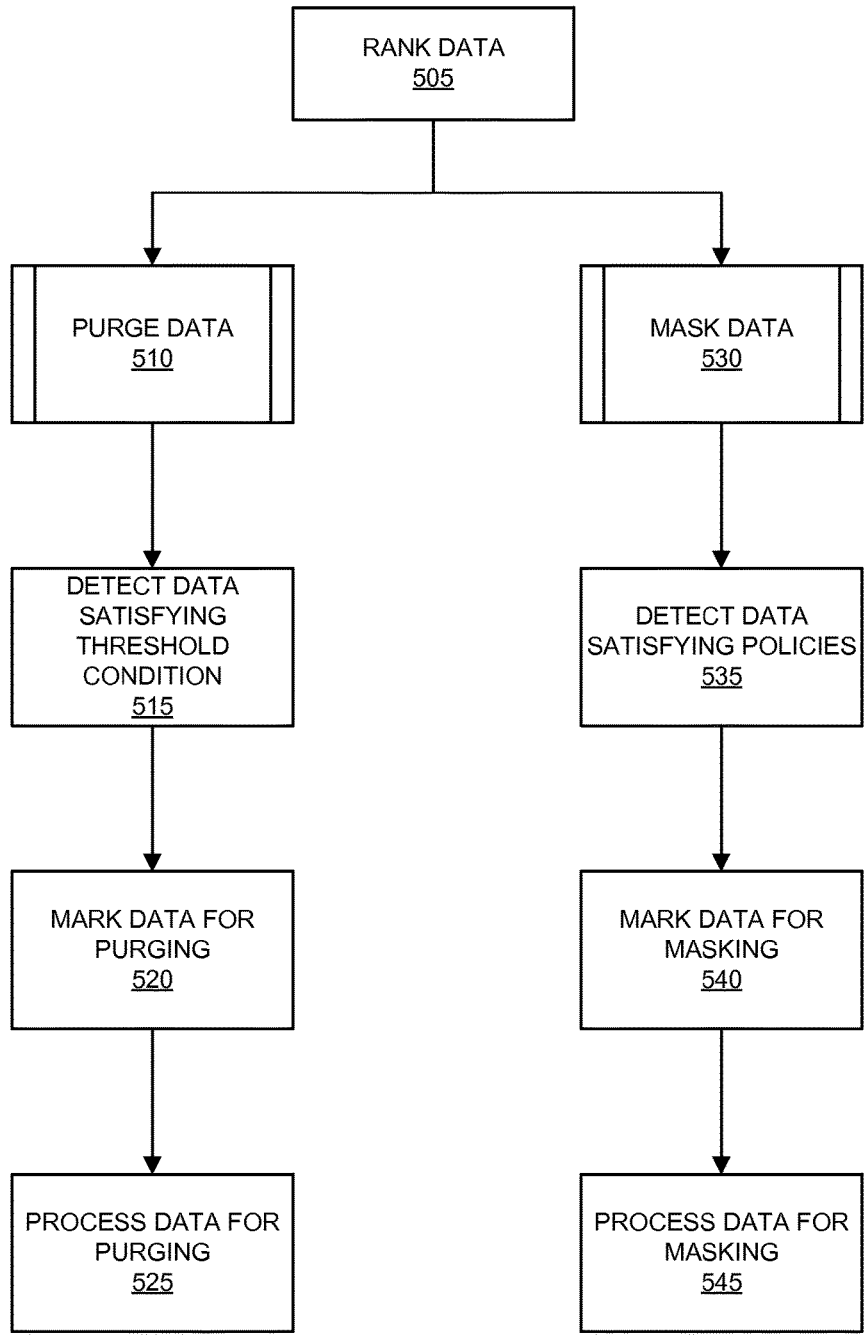
FIG. 7 is an exemplary flowchart of ranking data for purging and masking in accordance with the flowchart of FIG. 5.

FIG. 7 is an exemplary flowchart of ranking data for purging and masking in accordance with the flowchart of FIG. 5. In particular, FIG. 7 discloses a more detailed description of the rank data in 215 of FIG. 5. The data analyzed in FIG. 6 is ranked to determine whether the data should be purged or masked to reduce the overall amount of data being stored and processed. The reduction or masking of the data is key to efficiently process the data. Moreover, the reduction of data allows for less utilization of storage space, which is a significant factor when storing big data. The ranking of data (rank data 505) is executed using two sub-processes, namely purge data 510 and mask data 530. A ranking processor 70 may be used to perform the analysis. Ranking processor 70 may include, for example, a ranking analyzer 70A, a policy analyzer 70B, and correlation analytics 70C. Ranking by the ranking processor 70 may begin once the data in data sources 40 has been analyzed by the processor 25 and analytics 30 of data analytics 20, including completion of pattern processor 55 and any other analytics being executed to analyze the data, as described with reference to FIG. 6. Ranking of the data has been previously described with reference to FIG. 3 and will therefore not be detailed again. However, in determining whether to mark and process data for purging 520, 525, the ranked data is analyzed to determine whether rule sets, instructions, criteria, ranges and/or threshold conditions have been satisfied. For example, if a range is set to be "less than 50 mph and greater than 20 mph", the analyzed data must satisfy the range in order to be marked for purging. Thus, if a sensor measures the speed of a vehicle as 30 mph, the range is satisfied and the data will be marked for purging. In this particular instance, the data marked for purging is not relevant and need not be processed, but data falling outside of the range is relevant for further analysis. Imagine data being stored by a government unit such as a police force. The unit collects enormous amounts of data and requires a means to process the data. In this example, one means is to ignore (or mask) the data. For example, vehicles that travel within a specified speed range satisfy the speed limit condition and do not require further analysis (vehicles are not speeding), while vehicles traveling outside of the speed range do not fall within the speed range and require additional analysis (vehicles may be speeding, but further analysis required).

Similarly, data may be detected to satisfy policies to mark the data for masking. Data masking is a process whereby the information in a database is masked or de-identified to ensure the protection of sensitive information stored in the database, while allowing the analysis of non-sensitive data that is part of the same information. The data masking process enforces "need to know access", minimizing the risks associated with real-time data analysis. Policies can also be applied to the data using policy analyzer 70B and policy rules stored in policy rule set database 80. For example, in the case of sensitive or privacy data policies, the policy analyzer 70B may select a set of sensitive data types that need to be protected. Examples include, but are not limited to, credit card numbers, social security numbers, medical record numbers, addresses, names of patients, names high net-worth individuals, driver's license numbers, and bank account numbers. There can also be policies stored in the policy rule set database 80 controlling how the sensitive data, once identified, is handled by the policy analyzer 70B. For example, one policy might state that credit card numbers should be masked with a format-preserving masking. Thus, if the policy analyzer 70B detects data to be credit card data, the policy relating to sensitive data types is satisfied (535), and the data will be marked for masking at 540. Marking of the data may include, for example, processing the data to add a flag or tag or other identifying features or characteristics to indicate the data is ready to be purged or masked (525, 545).

Figure 8:
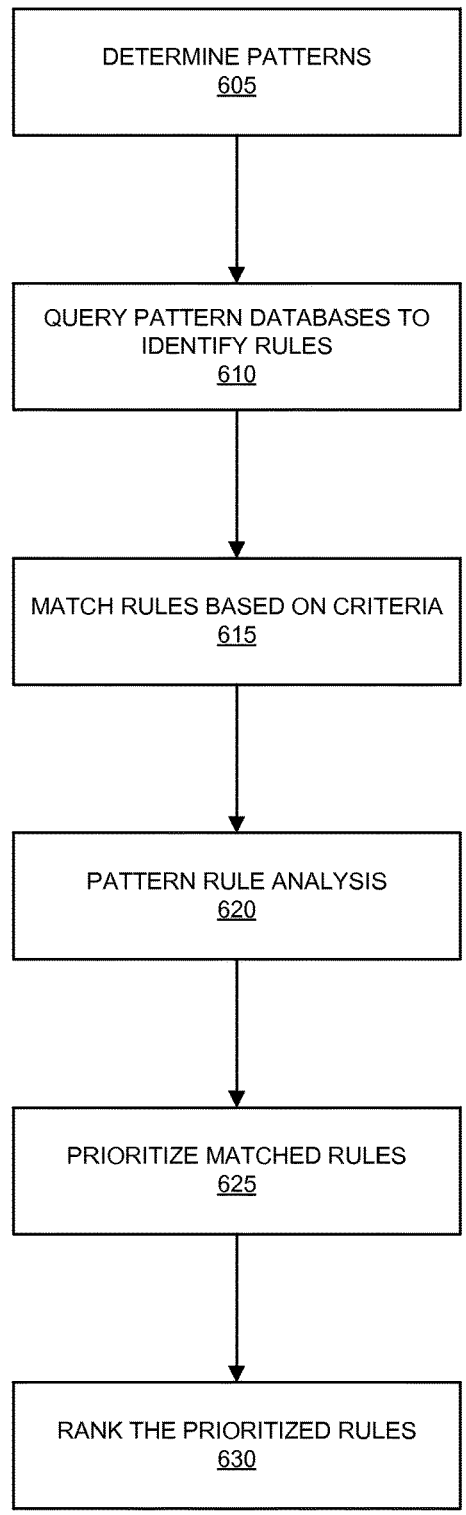
FIG. 8 is an exemplary flowchart of determining patterns in accordance with the flowchart of FIG. 5.

FIG. 8 is an exemplary flowchart of determining patterns in accordance with the flowchart of FIG. 5. In particular, FIG. 8 discloses a more detailed description of the determination of pattern changes in 225 of FIG. 5. To determine patterns (605), a query is made by the pattern processor 55 to the pattern database 65 and pattern rule set database 60 (FIG. 2) at 610. The query to the databases is to access the rules and rules sets stored therein to identify patterns in the data being analyzed, as detailed above. In one embodiment, rule based pattern correlation analytics 70C can include predetermined (e.g., preconfigured) rules. In other embodiments, rule based pattern correlation analytics 70C may include rules that are defined based on various patterns identified in system of FIG. 1. In yet other embodiments, rules may be specified to predict various results and/or scenarios, for example, using predictive analytics. Moreover, in other embodiments, the pattern database 65 and pattern rule set database 60 may be used to improve the pattern detection accuracy. For example, the databases may be provided with various learning patterns associated with complex and non-linear data sets. Sample derived data for learning may be extracted from actual data and patterns and provided as a result of the analysis. Other techniques such as trend-changing mechanisms and pattern matching algorithms may also be used.

At 615, rules from the pattern and pattern ruleset databases are matched based upon the storage variety of factors including, for example, whether the data is graphical, textual, mathematical, the format of the data, the genre of the data, etc. At 620, the matched rules are sent to the pattern processor 55 and/or ranking processor 70 for rule analysis, such as rule prioritization and ranking. Alternatively, the matched rules may be sent to server 50 for processing, or any other remote location capable of processing. The matched rules are prioritized at 625 based on criteria stored, for example, in memory 35, server 50, policy rule set database 80 or ranking rule set database 85. At 630, the prioritized rules are ranked by the ranking processor 70, as described above with reference to FIG. 2.

In another embodiment, and as part of the pattern analysis (605-630), the pattern processor 55 is responsible for the rule selection based on input data in the pattern rule set database 60 and pattern database 65, as well as providing matched rules to ranking processor 70. Matched rules includes, for example, rule based data matching to determine if data or subsets of data are similar such that the data may be merged into a single set of data. In one embodiment, rules based matching executes a rule or data mines a set of target objects to match against the data or subset of data. The rule may be, for example, a predetermined or default rule that compares the fields of a source and target object. The ranking processor 70 then prioritizes the matched rules based on rules stored in the ranking rule set database 85, policy rule set database 80 and other predetermined criteria. Once the matched rules have been prioritized, the prioritized rules may be processed against the data by processor 55. Processed data may then be stored in the data sources 40 for storage. Using pattern and rule-based data, users of the system are afforded the opportunity to define rules and facts based on business requirements and may instruct the system to prioritize the matched rules based upon a variety of factors and criteria. Thus, the pattern analysis provides a procedure by which data may be reduced for improved storage and processing.

In one embodiment, there is a method of reducing data in a storage system, including accessing the data stored in the storage system by a processor; parsing the data accessed from the storage system into subsets of data using the processor, the parsing comprising categorizing the subsets of data using key identifiers, each of the categorical subsets of data analyzed based on a rule set associated with a respective category for each of the subsets of data; for each of the analyzed subsets of data, using the processor to detect the subsets of data to be purged based on a threshold condition having been satisfied, and ranking the subsets of data for which the threshold condition has been satisfied, and detect the subsets of data to be masked based on a policy having been satisfied, and ranking the subsets of data for which the policy has been satisfied; individually marking the subsets of data based on the ranking for purging using the processor when the threshold condition has been satisfied, and individually marking the subsets of data for masking based on the ranking using the processor when the policy has been satisfied; identifying pattern changes using the processor between the subsets of data prior to analysis and the marked subsets of data for purging and between the subsets of data prior to analysis and the marked subsets of data for masking; and processing the subsets of data for permanent change by reducing the amount of data using the processor when pattern changes satisfying a predetermined criteria have been identified, and providing the permanently changed subsets of data with the reduced amount of data to the storage system for storage.

In another embodiment, there is an apparatus to reduce storage of data, including a data source to store data for processing; a processor configured to categorize and analyze subsets of the data accessed from the data source; the processor configured to, for each of the analyzed subsets of data, detect and rank the subsets of data to be one of purged or masked data based on range; and the processor configured to mark the subsets of data based on the ranking for purging when the range is satisfied, and mark the subsets of data for masking based on the ranking of private data; the processor configured to identify pattern changes between the subsets of data prior to analysis and the marked subsets of data for purging and between the subsets of data prior to analysis and the marked subsets of data for masking; and the processor configured to process the subsets of data for updating by reducing the amount of data using the processor when pattern changes satisfying a predetermined criteria have been identified, and providing the updated subsets of data with the reduced amount of data to the storage system for storage.

In yet another embodiment, there is a computer program product, including a computer readable storage medium having computer readable program code embodied therewith, the computer readable program code comprising: computer readable program code configured to access subsets of data from a data source, comprising categorizing and analyzing the subsets of data using relationships based on correlated subsets of data; computer readable program code configured to, for each of the analyzed subsets of data, detect and rank the subsets of data to be one of purged or masked based on a threshold condition; and computer readable program code configured to mark the subsets of data based on the ranking for purging when a threshold condition has been satisfied, and mark the subsets of data for masking based on the ranking when a policy has been satisfied; computer readable program code configured to identify pattern changes between the subsets of data prior to analysis and the marked subsets of data for purging and between the subsets of data prior to analysis and the marked subsets of data for masking; and computer readable program code configured to process the subsets of data for permanent change by reducing the amount of data using the processor when pattern changes satisfying the relationship between the correlated subsets of data have been identified, and providing the permanently changed subsets of data with the reduced amount of data to the storage system for storage.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of reducing data in a storage system, comprising:
    accessing the data stored in the storage system by a processor;
    parsing the data accessed from the storage system into subsets of data using the processor, the parsing comprising categorizing the subsets of data, in response to a query, into a plurality of categories including a category to determine relevancy, wherein data in the relevancy category is generated by correlating identified patterns to generate a relationship sequence and to correlate each relationship in the relationship sequence, and wherein the relationships are used to determine the relevancy of the data;
    for each of the categorized subsets of data, using the processor to
        detect the subsets of data to be purged based on a threshold condition having been satisfied, and ranking the subsets of data for which the threshold condition has been satisfied, and
        detect the subsets of data to be masked based on a policy having been satisfied, and ranking the subsets of data for which the policy has been satisfied;
    individually marking each of the subsets of data based on the ranking for purging using the processor when the threshold condition has been satisfied, and individually marking each of the subsets of data for masking based on the ranking using the processor when the policy has been satisfied;
    identifying pattern changes using the processor between each of the subsets of data prior to a first purging and the marked subsets of data for purging or between each of the subsets of data prior to a first masking and the marked subsets of data for masking; and
    processing each of the subsets of data, prior to the first purging and prior to the first masking, for permanent changes by reducing the amount of data using the processor when pattern changes satisfying a predetermined criteria have been identified, and providing the permanently changed subsets of data with the reduced amount of data to the storage system for storage.

2. The method of claim 1, further comprising:
    during the categorization of each of the subsets of data, applying the key identifiers by the processor to identify characteristics of the content in each of the subsets of data that are associated with a specific category; and
    during the categorizing of the subsets of data, applying one of the rule sets by the processor comprising search parameters to a respective one of the categorized subsets of data to parse for data matching the search parameters.

3. The method of claim 2, wherein the analyzing of the rules sets by the processor further comprises:
    determining patterns in the subsets of data by querying a pattern repository storing patterns, each pattern stored in the pattern repository defining a discernable regularity of a known element that repeats in a predictable manner, and analyzing the data in each of the subsets of data using the search parameters to determine a pattern exists when the query is satisfied;

computing a value using the search parameters corresponding to the persistence of the data in the subsets of data and comparing the value to a predetermined threshold, and analyzing the computed value and predetermined threshold to determine the persistence of the data satisfies the predetermined threshold when the value exceeds the predetermined threshold;

classifying data, using the search parameters, in each of the subsets of data as private or public based on secure classification criteria, and classifying the data in each of the subsets of data as private when the data satisfies the secure classification criteria; and querying the data in each of the subsets of data based on the search parameters having been manually input as conditions, and identifying the data satisfying the conditions.

4. The method of claim 3, wherein the ranking by the processor to analyze the subsets of data comprises:

marking the data in the subsets of data for purging when any one of the rule sets is satisfied and the threshold condition is not exceeded as a result of the rule set being satisfied; and marking the data in the subsets of data for masking when any one of the rule sets is satisfied and the policy has been satisfied and the threshold condition is not exceeded as a result of the policy being satisfied.

5. The method of claim 4, wherein the detection of pattern changes by the processor comprises identifying pattern changes, using the processor, in the subsets of data having marked data, without analyzing the marked data, by querying the pattern repository; and determining a pattern exists when a pattern in the pattern repository matches a pattern in the subset of data without the marked data.

6. The method of claim 5, wherein the processor is configured to compare identified pattern changes in the analysis of subsets of data to pattern changes in the analysis of subsets of data having marked data, when results of the comparison fall within the predetermined criteria, purging the marked data from the subsets of data marked to be purged and masking the marked data from the subsets of data marked to be masked; and when the results of the comparison fall outside of the predetermined criteria, modify the threshold condition such that ranking of the subsets of data is modified for re-processing and analysis.

7. The method of claim 6, wherein the processor accesses the storage system to update the data stored therein to reflect the purged and masked subsets of data when the comparison results fall within the predetermined criteria.

8. The method of claim 4, wherein the policy is stored in a policy database and comprises a policy for sensitive data, access to the data, privacy of the data, copying of the data, or encryption of the data.

9. An apparatus to reduce storage of data, comprising:
a data source to store data for processing; and
a processor configured to parse data accessed from the data source into subsets of data, the parsing comprising categorizing the subsets of data, in response to a query, into a plurality of categories including a category to determine relevancy, wherein data in the relevancy category is generated by correlating identified patterns to generate a relationship sequence and to correlate each relationship in the relationship sequence, and wherein the relationships are used to determine the relevancy of the data, for each of the categorized subsets of data the processor is configured to detect and rank the subsets of data to be one of purged or masked data based on range, the processor is configured to mark each of the subsets of data based on the ranking for purging when the range is satisfied, and mark each of the subsets of data for masking based on the ranking of private data, the processor configured to identify pattern changes between each of the subsets of data prior to first purging and the marked subsets of data for purging and between each of the subsets of data prior to first masking and the marked subsets of data for masking, the processor configured to process each of the subsets of data, prior to the first purging and prior to the first masking, for updating by reducing the amount of data using the processor when pattern changes satisfying a predetermined criteria have been identified, providing the updated subsets of data with the reduced amount of data to the storage system for storage, the processor is configured to identify when a pattern in a pattern repository matches a pattern in the marked subsets of data.

10. The apparatus of claim 9, wherein:
the processor is configured to use key identifiers to categorize the subsets of data, each of the categorical subsets of data analyzed based on a rule set associated with a respective category for each of the subsets of data, and determine the ranking when the range has been satisfied.

11. The apparatus of claim 10, wherein:
the processor is configured to, during the categorization of each of the subsets of data, apply the key identifiers to identify characteristics of the content in each of the subsets of data that are associated with a specific category; and the processor is configured to, during the analysis of the categorized subsets of data, apply rule sets comprising search parameters to a respective one of the categorized subsets of data to parse for data matching the search parameters.

12. The apparatus of claim 11, wherein:
the rules sets are stored in a rule set database such that the processor is configured to access and apply the rule sets;

the processor is configured to determine patterns in the subsets of data by querying a pattern repository storing patterns, each pattern stored in the pattern repository defining a discernable regularity of a known element that repeats in a predictable manner, and analyzing the data in each of the subsets of data using the search parameters to determine a pattern exists when the query is satisfied;

the processor is configured to compute a value using the search parameters corresponding to the persistence of the data in the subsets of data and comparing the value to a predetermined threshold, and analyzing the computed value and predetermined threshold to determine the persistence of the data satisfies the predetermined threshold when the value exceeds the predetermined threshold;

the processor is configured to classify data, using the search parameters, in each of the subsets of data as sensitive or public based on secure classification criteria, and classifying the data in each of the subsets of data as sensitive when the data satisfies the secure classification criteria; and the processor is configured to query the data in each of the subsets of data based on the search parameters having been manually input as conditions, and identifying the data satisfying the conditions.

13. The apparatus of claim 12, wherein:
when ranking, the processor is configured to analyze the subsets of data;
the processor is configured to mark the data in the subsets of data for purging when any one of the rule sets is satisfied and the data falls within the as a result of the rule set being satisfied; and
the processor is configured to mark the data in the subsets of data for masking when any one of the rule sets is satisfied and the ranking of private data has been satisfied and the data falls within the range as a result of the ranking of private data being satisfied.

14. The apparatus of claim 13,
the processor configured to access a pattern detection database
to determine a pattern exists when a pattern in the pattern repository matches a pattern in the subset of data without the marked data.

15. The apparatus of claim 14, wherein the processor is configured to compare identified pattern changes in the analysis of subsets of data to pattern changes in the analysis of subsets of data having marked data,
when results of the comparison fall within the predetermined criteria, the processor configured to purge the marked data from the subsets of data marked to be purged and masking the marked data from the subsets of data marked to be masked; and
when the results of the comparison fall outside of the predetermined criteria, the processor configured to modify the range such that ranking of the subsets of data is modified for re-processing and analysis.

16. The apparatus of claim 15, wherein the processor is configured to access the data source to update the data stored therein to reflect the purged and masked subsets of data when the comparison results fall within the predetermined criteria.

17. The apparatus of claim 13, wherein the ranking of private data is a policy stored in a policy database and comprises a policy for sensitive data, access to the data, privacy of the data, copying of the data, or encryption of the data.

18. A computer program product, comprising:
a non-transitory computer readable storage medium having computer readable program code embodied therewith, the computer readable program code comprising:
computer readable program code configured to parse data accessed from a data source into subsets of data, the parsing comprising categorizing the subsets of data, in response to a query, into a plurality of categories including a category to determine relevancy, wherein data in the relevancy category is generated by correlating identified patterns to generate a relationship sequence and to correlate each relationship in the relationship sequence, and wherein the relationships are used to determine the relevancy of the data;
computer readable program code configured to, for each of the categorized subsets of data, detect and rank the subsets of data to be one of purged or masked based on a threshold condition; and
computer readable program code configured to mark each of the subsets of data based on the ranking for purging when a threshold condition has been satisfied, and mark each of the subsets of data for masking based on the ranking when a policy has been satisfied;
computer readable program code configured to identify pattern changes between each of the subsets of data prior to first purging and the marked subsets of data for purging and between each of the subsets of data prior to first masking and the marked subsets of data for masking, wherein the pattern changes are identified when a pattern in a pattern repository matches a pattern in the marked subsets of data; and
computer readable program code configured to process each of the subsets of data, prior to the first purging and prior to the first masking, for permanent changes by reducing the amount of data using the processor when pattern changes satisfying the relationship between the correlated subsets of data have been identified, and providing the permanently changed subsets of data with the reduced amount of data to the storage system for storage.

19. The computer program product of claim 18, wherein the computer readable program code is configured to
use key identifiers to categorize the subsets of data, each of the categorical subsets of data analyzed based on a rule set associated with a respective category for each of the subsets of data, and
determine the ranking when the threshold condition has been satisfied.

20. The computer program product of claim 19, wherein the computer readable program code is configured to
during the categorization of each of the subsets of data, apply the key identifiers to identify characteristics of the content in each of the subsets of data that are associated with a specific category; and
during the analysis of the categorized subsets of data, apply one of the rule sets comprising search parameters to a respective one of the categorized subsets of data to parse for data matching the search parameters.

21. The computer program product of claim 20, wherein the rules sets are stored in a rule set database such that computer readable program code is configured to access and apply the rule sets, the computer program product further comprising:
computer readable program code configured to determine patterns in the subsets of data by querying a pattern repository storing patterns, each pattern stored in the pattern repository defining a discernable regularity of a known element that repeats in a predictable manner, and analyzing the data in each of the subsets of data using the search parameters to determine a pattern exists when the query is satisfied;
computer readable program code configured to compute a value using the search parameters corresponding to the persistence of the data in the subsets of data and comparing the value to a predetermined threshold, and analyzing the computed value and predetermined threshold to determine the persistence of the data satisfies the predetermined threshold when the value exceeds the predetermined threshold;
computer readable program code configured to classify data, using the search parameters, in each of the subsets of data as private or public based on secure classification criteria, and classifying the data in each of the subsets of data as private when the data satisfies the secure classification criteria; and
computer readable program code configured to query the data in each of the subsets of data based on the search parameters having been manually input as conditions, and identifying the data satisfying the conditions.

22. The computer program product of claim 21, wherein the computer readable program code when ranking is configured to analyze the subsets of data such that
   computer readable program code configured to mark the data in the subsets of data for purging when any one of the rule sets is satisfied and the threshold condition is not exceeded as a result of the rule set being satisfied; and
   computer readable program code configured to mark the data in the subsets of data for masking when any one of the rule sets is satisfied and the policy has been satisfied and the threshold condition is not exceeded as a result of the policy being satisfied.

23. The computer program product of claim 22,
   wherein the computer readable program code is configured to access a pattern detection database
      to determine a pattern exists when the pattern in the pattern repository matches a pattern in the subset of data without the marked data.

24. The computer program product of claim 23, wherein the computer readable program code is configured to compare identified pattern changes in the analysis of subsets of data to pattern changes in the analysis of subsets of data having marked data,
   when results of the comparison fall within the predetermined criteria, computer readable program code configured to purge the marked data from the subsets of data marked to be purged and masking the marked data from the subsets of data marked to be masked; and
   when the results of the comparison fall outside of the predetermined criteria, computer readable program code configured to modify the threshold condition such that ranking of the subsets of data is modified for re-processing and analysis.

25. The method of claim 1, wherein the plurality of categories further include categories including one or more of age, privacy and manual query, and wherein
   the category of age includes age data generated by identifying a persistence of the data based on a threshold analysis in which the data satisfies a range or criteria,
   the category of privacy including privacy data generated based on one or more policy based rule sets that classifies the data as sensitive or private, and
   the category of manual query includes data generated based on an analysis of the data that satisfies predefined rules or criteria.

* * * * *